(12) United States Patent
Saiz

(10) Patent No.: US 6,446,908 B1
(45) Date of Patent: Sep. 10, 2002

(54) AIRCRAFT LIFT ARRANGEMENT

(76) Inventor: Manuel Munoz Saiz, San Emilio 16, 1, 3, Madrid (ES), 98017

( * ) Notice: Subject to any disclaimer, the term of this patent is extended or adjusted under 35 U.S.C. 154(b) by 0 days.

(21) Appl. No.: 09/612,694

(22) Filed: Jul. 10, 2000

Related U.S. Application Data

(63) Continuation-in-part of application No. 09/372,890, filed on Aug. 12, 1999.

(51) Int. Cl.[7] .............................. B64C 3/10; B64C 5/06
(52) U.S. Cl. ...................... 244/45 R; 244/36
(58) Field of Search ................. 244/36, 45 R, 244/198

(56) References Cited

U.S. PATENT DOCUMENTS

| | | | | |
|---|---|---|---|---|
| 1,876,635 A | * | 9/1932 | Deutscher | 244/198 |
| 3,385,538 A | * | 5/1968 | Hodges | 244/45 R X |
| 4,381,091 A | * | 4/1983 | Pegram | 244/45 R X |
| 5,899,409 A | * | 5/1999 | Frediani | 244/45 R X |

* cited by examiner

*Primary Examiner*—Robert P. Swiatek
(74) *Attorney, Agent, or Firm*—Robert M. Schwartz

(57) ABSTRACT

An aircraft lift arrangement that consists of fine fins which are parallel among themselves and slightly curved, arranged attached along the sides of the aircraft fuselage, beginning at the front and running downward toward the rear, with a positive angle of attack and with the additional of small thin wings to provide lateral stability and to carry the engines, flaps and ailerons.

11 Claims, 3 Drawing Sheets

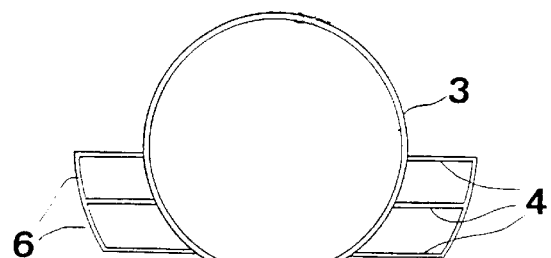
FIG.9
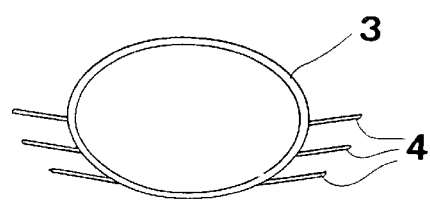
FIG.10
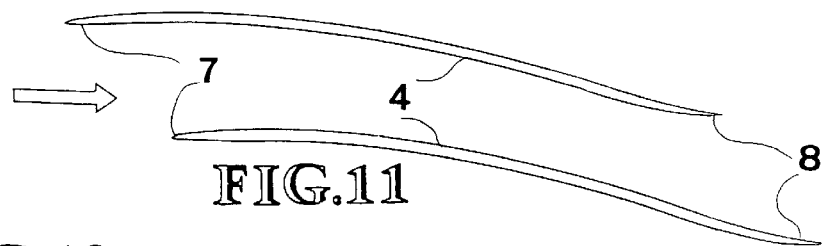
FIG.11
FIG.12
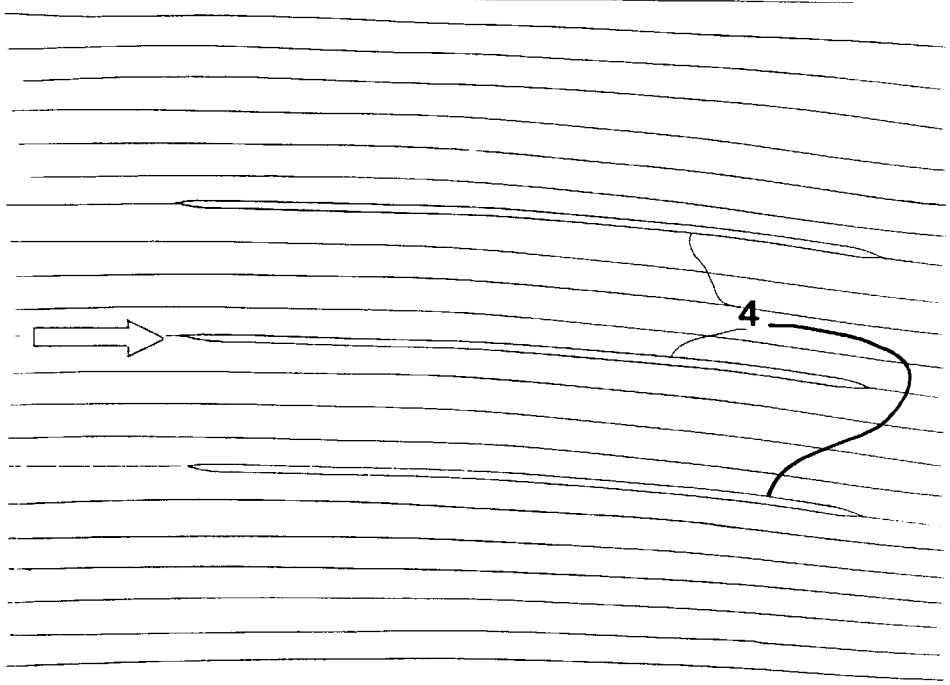

AIRCRAFT LIFT ARRANGEMENT

CROSS REFERENCES TO RELATED APPLICATIONS

This patent application is a Continuation-In-Part of U.S. patent application Ser. No. 09/372,890, filed on Aug. 12, 1999.

This patent claims the priority date of Spanish Patent P9902646 filed on Dec. 1, 1999. The basis for priority in this case is the Paris Convention for the Protection of Industrial Property (613 O.G. 23, 53 Stat 1748). The Spanish patent application was filed in the Official Patent and Trademark Office of Spain.

BACKGROUND OF THE INVENTION

1. Field of the Invention

This invention relates to aircraft lift systems.

2. Description of the Related Art

This patent is a partial continuation of Spanish patent P9900680: at present, wings used on aircraft need extremely high consistency, and particularly, because of the large span, they are heavy, voluminous and generally have low-efficiency, proving complicated and more costly. They are also highly resistant to advancement and greatly affected by turbulence or gusting. These drawbacks are reduced in part with this invention.

BRIEF SUMMARY OF THE INVENTION

The aircraft lift arrangement consists of fine fins which are parallel among themselves and slightly curved, arranged attached along the sides of an aircraft fuselage, beginning at the front and running downward toward the rear, with a positive angle of attack and with additional small thin wings to provide lateral stability and to carry the engines, flaps and ailerons.

Said small wings, installed separately or on any of the lift fins, may be at the front, in the center or at the rear lateral surface of the aircraft fuselage: in the latter case, they can carry the stabilizers and elevators.

The fins can be arranged along the largest part of the fuselage side and they can comprise a single element.

The fuselage may be oval in cross-section, with flattened sides, so as to reduce side wind effect.

The center of the fins may be slightly curved, with a positive angle of attack, the front or leading edge is horizontal or with a slightly negative angle and the rear or trailing edge roughly horizontal.

Short fins can also be used, fitted in several groups.

The fin transverse cross-section may be parallel to the aircraft's transverse axis.

The transverse cross-section of the fins can form acute angles with the transverse axis of the aircraft, similar to an aircraft wing dihedral angle.

The outer edges of the fins may have a plate at a tangent to the surface of the aircraft fuselage to increase performance.

The outer edges of adjacent fins may be joined by plates to give a flattened tube shape.

In operation, the air flow arrives at the edge of attack of the fins which, being curved downward, direct that flow down to where it leaves at the trailing edge. The downward displacement of the flow causes the fins and thus the aircraft to react upward, i.e. lift.

Advantages for the aircraft lift arrangements of the present invention include: Advantages: they do not need high consistency, they are light, small, high-performing, simple and economical. They offer little forward resistance and are less affected by turbulence and gusting.

BRIEF DESCRIPTION OF THE DRAWINGS

FIGS. 5 to 10 show various transverse cross-section of fuselages with different types of fins and small wings.

FIGS. 11 and 12 show side views of two different types of fins.

DETAILED DESCRIPTION OF THE INVENTION

Figure 1:
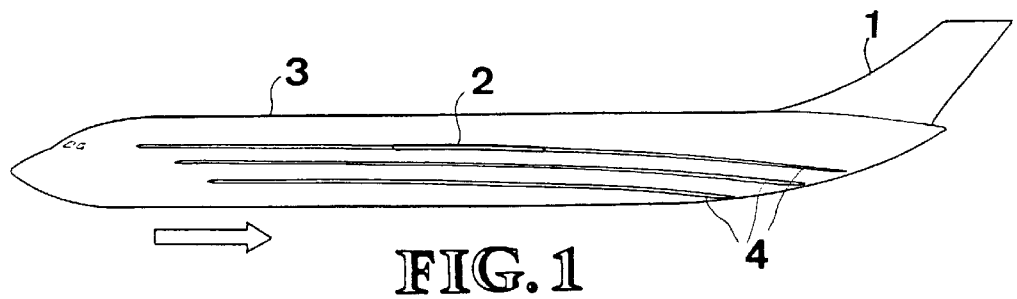
FIG. 1 shows a side, schematic view of an aircraft with the arrangement of the invention.

FIG. 1 consists of the tail 1, the fine, parallel and slightly curved fins 4, arranged attached along the sides of the aircraft fuselage 3, beginning at the front and running downward toward the rear, with a positive angle of attack and with the additional of small thin wings 2 to provide lateral stability and to carry the engines, flaps and ailerons.

Figure 2:
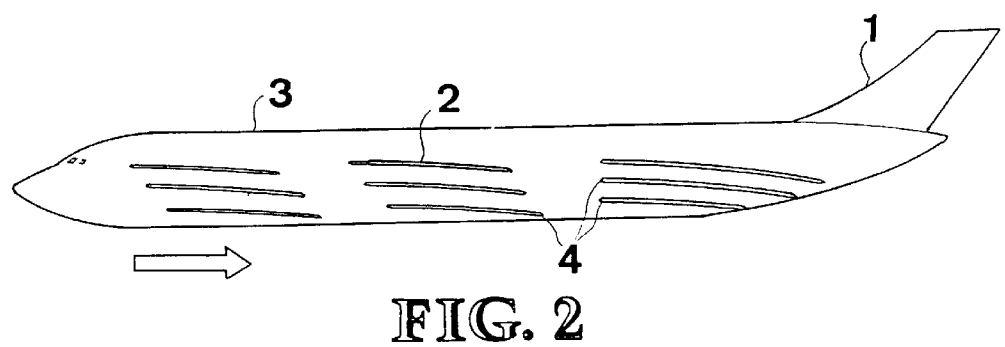
FIGS. 2 to 4 show side, schematic views of different aircrafts and variants with the arrangement of the invention.

FIG. 2 consists of the tail 1, the small wing 2, the fuselage 3 and the short fins 4, fitted in several groups.

Figure 3:
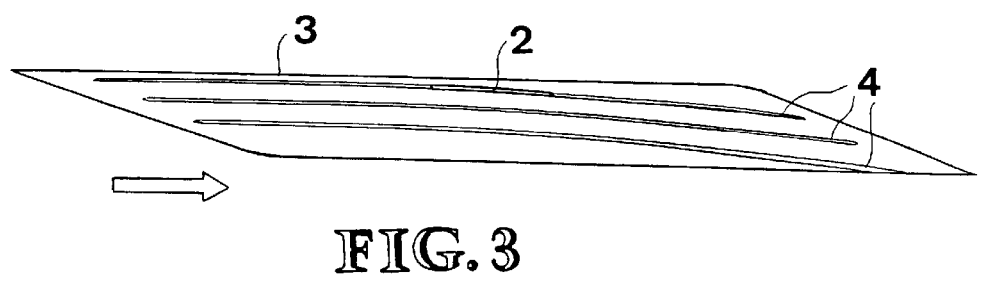

FIG. 3 consists of the small wing 2, the modified fuselage 3 and the fins 4.

Figure 4:
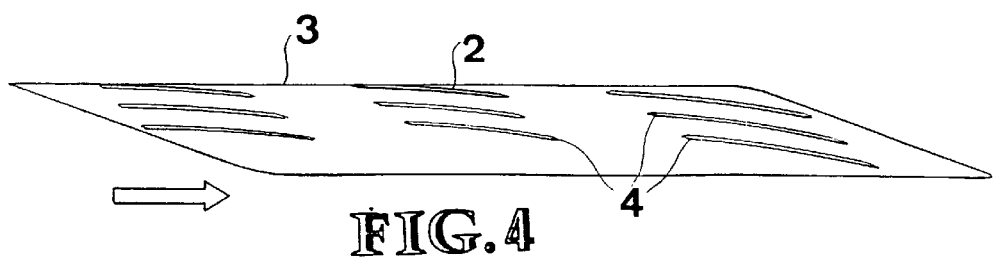

FIG. 4 consists of the small wing 2, the modified fuselage 3 and the short fins 4, fitted in several groups.

Figure 5:
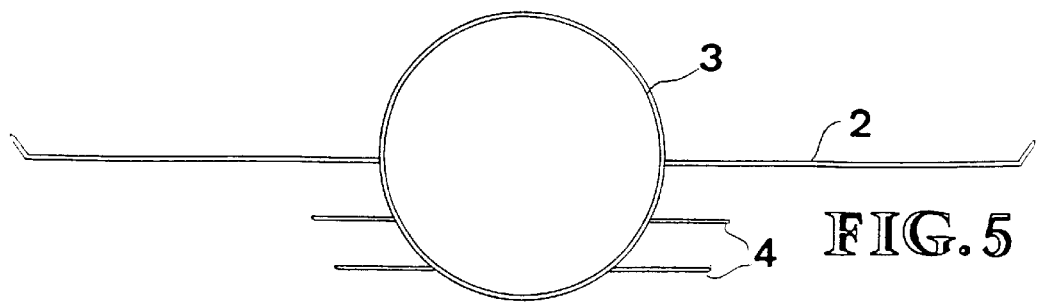

FIG. 5 consists of the small wing 2, the fuselage 3 and the fins 4.

Figure 6:
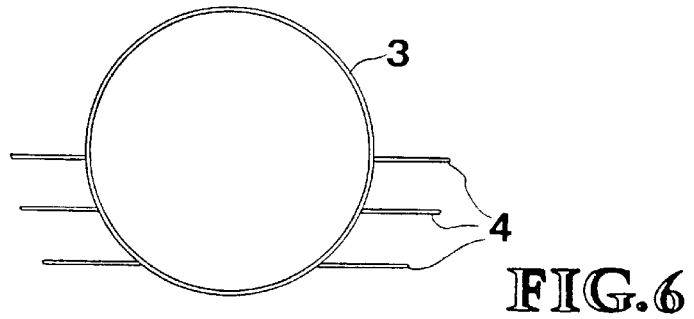

FIG. 6 consists of the fuselage 3 and the horizontal transverse cross-section fins 4.

Figure 7:
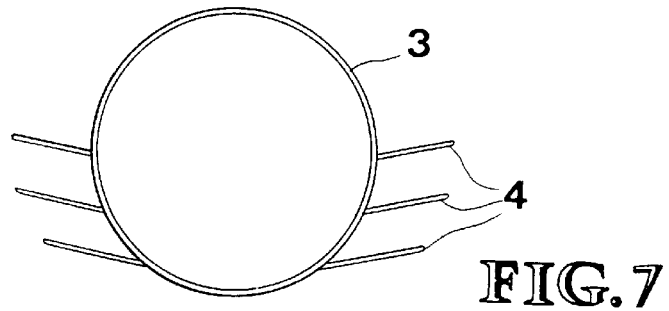

FIG. 7 consists of the fuselage 3 and the laterally inclined fins 4.

Figure 8:
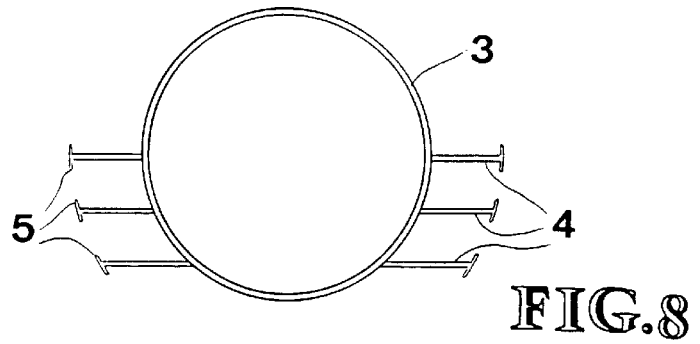

FIG. 8 consists of the fuselage 3, the fins 4 and the plates 5 at their outer edges.

FIG. 9 consists of the fuselage 3, with the outer edges of adjacent fins 4 joined by plates 6 to give a flattened tube shape.

FIG. 10 consists of the oval cross-section fuselage 3 and the fins 4.

FIG. 11 shows the center of the fin 4 slightly curved, with a positive angle of attack, the front or leading edge 7 is horizontal or with a slightly negative angle and the rear or trailing edge 8 roughly horizontal.

FIG. 12 shows the air flow arriving at the edge of attack of the fins 4 which, being curved downward, direct that flow down to where it leaves at the trailing edge.

The arrows indicate the airflow with reference to the aircraft of fins.

What I claim is:

1. An aircraft lift arrangement that consists of fine fins which are parallel themselves and slightly curved, arranged attached along the sides of an aircraft fuselage, beginning at the front and running downward toward the rear, with a positive angle of attack, and with additional small thin wings to provide lateral stability and to carry the engines, flaps and ailerons.

2. The aircraft lift arrangement according to claim 1, wherein the small wings installed separately of the lift fins.

3. The aircraft lift arrangement according to claim 1, wherein the small wings are installed on any of the lift fins.

4. The aircraft lift arrangement according to claim 1, wherein the small fins are installed in the lateral center of the fuselage along the line midway between the front and rear of the aircraft.

5. The aircraft lift arrangement according to claim 1, wherein the fins comprise a single element and are arranged along the largest part of the fuselage sides.

6. The aircraft lift arrangement according to claim 1, wherein the fuselage is oval in cross-section with flattened sides.

7. The aircraft lift arrangement according to claim 1, wherein the centers of the fins are slightly curved with a positive angle of attack, the front or leading edge is horizontal or with a slightly negative angle and the rear or trailing edge roughly horizontal.

8. The aircraft lift arrangement according to claim 1, wherein short fins are used, fitted in several groups.

9. The aircraft lift arrangement according to claim 1, wherein the fin transverse cross-section is parallel to the aircraft's transverse axis.

10. The aircraft lift arrangement according to claim 1, wherein the outer edges of the fins have a plate at a tangent to the surface of the aircraft fuselage.

11. The aircraft lift arrangement according to claim 1, wherein the outer edges of adjacent fins are joined by plates to give a flattened tube shape.

* * * * *